US012710016B2

(12) United States Patent
Uchida

(10) Patent No.: US 12,710,016 B2
(45) Date of Patent: Aug. 18, 2026

(54) CONTROL DEVICE FOR VEHICLE

(71) Applicant: TOYOTA JIDOSHA KABUSHIKI KAISHA, Toyota (JP)

(72) Inventor: Akito Uchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/975,101

(22) Filed: Dec. 10, 2024

(65) Prior Publication Data

US 2025/0250949 A1 Aug. 7, 2025

(30) Foreign Application Priority Data

Feb. 6, 2024 (JP) ................................ 2024-016595

(51) Int. Cl.

*F02D 41/30* (2006.01)
*F02D 41/22* (2006.01)
*G07C 5/08* (2006.01)

(52) U.S. Cl.

CPC ......... *F02D 41/3076* (2013.01); *F02D 41/22* (2013.01); *G07C 5/0808* (2013.01); *F02D 2200/101* (2013.01)

(58) Field of Classification Search

CPC .... F02D 41/3076; F02D 41/22; F02D 41/062; F02D 29/02; F02D 2200/01; F02D 2200/604; F02D 2041/228; F02D 2250/26; G07C 5/0808

See application file for complete search history.

(56) References Cited

U.S. PATENT DOCUMENTS

| | | | | |
|---|---|---|---|---|
| 8,712,615 | B2 * | 4/2014 | Omote | G10K 15/02 701/22 |
| 9,365,158 | B2 * | 6/2016 | Barlow, Jr. | G10K 15/04 |
| 12,175,962 | B2 * | 12/2024 | Kim | H04R 3/00 |
| 2010/0222973 | A1 | 9/2010 | Senda et al. | |
| 2015/0016627 | A1 | 1/2015 | Barlow et al. | |
| 2018/0180012 | A1 * | 6/2018 | Yoshida | B60W 10/08 |
| 2019/0299993 | A1 * | 10/2019 | Inada | B60Q 1/46 |
| 2020/0193960 | A1 * | 6/2020 | Jung | G10K 11/17833 |
| 2021/0262409 | A1 | 8/2021 | Ochiai | |
| 2022/0056827 | A1 * | 2/2022 | Ahn | F02D 9/04 |
| 2025/0250949 | A1 * | 8/2025 | Uchida | F02D 41/3076 |

FOREIGN PATENT DOCUMENTS

| | | | |
|---|---|---|---|
| EP | 2 216 532 | A2 | 8/2010 |
| JP | 2004-232489 | A | 8/2004 |
| JP | 2010-185315 | A | 8/2010 |
| JP | 2010-275968 | A | 12/2010 |
| JP | 2012-007521 | A | 1/2012 |
| JP | 2015-199382 | A | 11/2015 |
| JP | 2019-181997 | A | 10/2019 |
| JP | 2021-134686 | A | 9/2021 |

* cited by examiner

*Primary Examiner* — Grant Moubry
(74) *Attorney, Agent, or Firm* — Oliff PLC

(57) ABSTRACT

A control device, for a vehicle, includes a mode determination unit configured to determine whether a traveling mode of the vehicle is switched to a circuit mode or not and a start sound control unit configured to execute a start sound increase process of increasing a start sound of a traveling power source of the vehicle in a case where the mode determination unit makes an affirmative determination, as compared to a case where the mode determination unit makes a negative determination.

3 Claims, 3 Drawing Sheets

CONTROL DEVICE FOR VEHICLE

CROSS-REFERENCE TO RELATED APPLICATION

This application is based upon and claims the benefit of priority of the prior Japanese Patent Application No. 2024-016595, filed on Feb. 6, 2024, the entire contents of which are incorporated herein by reference.

TECHNICAL FIELD

The present disclosure relates to a control device for a vehicle.

BACKGROUND

There is a vehicle that switches a traveling mode to a circuit mode (see, for example, Japanese Unexamined Patent Application Publication No. 2015-199382).

When the traveling mode is switched to the circuit mode, it is desirable to have performance to show a difference between the circuit mode and the other modes.

SUMMARY

It is therefore an object of the present disclosure to provide a control device for a vehicle with improved performance in a circuit mode.

The above object is achieved by a control device for a vehicle, the control device including: a mode determination unit configured to determine whether a traveling mode of the vehicle is switched to a circuit mode or not; and a start sound control unit configured to execute a start sound increase process of increasing a start sound of a traveling power source of the vehicle in a case where the mode determination unit makes an affirmative determination, as compared to a case where the mode determination unit makes a negative determination.

The traveling power source may be an engine, and the start sound control unit may be configured to execute the start sound increase process by increasing a blowing rotation speed at the time of starting the engine in a case where the mode determination unit makes an affirmative determination, as compared to a case where the mode determination unit makes a negative determination.

The control device, for the vehicle, may further include a fuel cut control unit configured to execute a fuel cut process of the engine when a rotation speed of the engine in an idle operation state is equal to or higher than a fuel cut rotation speed higher than a target idle rotation speed, wherein the fuel cut control unit may be configured to set the fuel cut rotation speed to a higher value during execution of the start sound increase process than during stop of the start sound increase process.

The control device, for the vehicle, may further include an abnormality determination unit configured to determine that an abnormality occurs in the engine, when a torque of the engine is higher than a predetermined reference value by a predetermined value or more during execution of the start sound increase process, wherein the predetermined reference value may be set to a torque of the engine during execution of the start sound increase process when the engine is normal.

The start sound control unit may stop the start sound increase process after a predetermined time elapses from start of the start sound increase process.

DETAILED DESCRIPTION

[Schematic Configuration of Vehicle]

Figure 1:
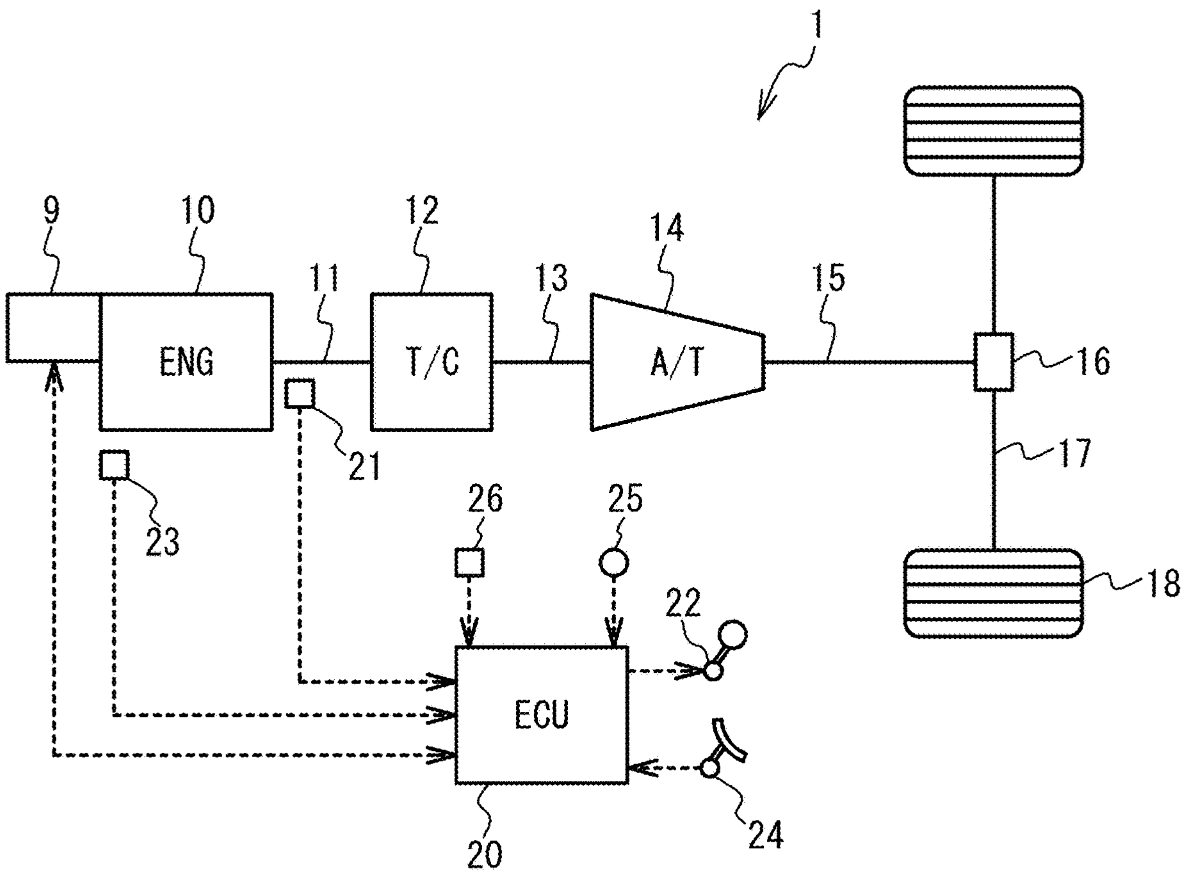
FIG. 1 is a schematic configuration view of a vehicle.

FIG. 1 is a schematic view illustrating a schematic configuration of a vehicle 1. The vehicle 1 includes an engine (ENG) 10, a torque converter (T/C) 12, and an automatic transmission (A/T) 14. The engine 10 is a gasoline engine, but may be a diesel engine. The engine 10 is cranked by a starter 9 and started. The torque converter 12 is connected to a crankshaft 11 of the engine 10. A turbine shaft 13 of the torque converter 12 is connected to an input side of the automatic transmission 14, and the driving force of the engine 10 is transmitted to the automatic transmission 14. An output shaft 15 of the automatic transmission 14 is connected to a differential gear 16 that is a final reduction gear. The differential gear 16 is connected to left and right shafts 17. The driving force transmitted to the output shaft 15 is transmitted to driving wheels 18 via the shafts 17.

The automatic transmission 14 is a stepped transmission and includes a plurality of hydraulic friction engagement elements and a planetary gear device. In the automatic transmission 14, the automatic transmission 14 is switched to any one of a P (parking) range, an R (reverse) range, an N (neutral) range, and a D (drive) range by selectively engaging a plurality of friction engagement elements.

An Electronic Control Unit (ECU) 20 executes control processes related to the vehicle 1. The ECU 20 is a computer including a central processing unit (CPU), a random access memory (RAM), and a read only memory (ROM). The ECU 20 functionally achieves a mode determination unit, a start sound control unit, a fuel cut control unit, and an abnormality determination unit, which will be described in detail later.

A crank angle sensor 21, a shift position sensor 22, an air flow meter 23, an accelerator opening sensor 24, a mode selection switch 25, and a vehicle speed sensor 26 are connected to the ECU 20. The crank angle sensor 21 detects an engine rotation speed. The shift position sensor 22 detects a position of a shift lever. The air flow meter 23 detects an intake air amount of the engine 10. The accelerator opening sensor 24 detects an accelerator opening degree that is an opening degree of an accelerator pedal. The mode selection switch 25 switches a traveling mode described later. The vehicle speed sensor 26 detects a vehicle speed.

The ECU 20 calculates a required torque and a target rotation speed of the engine 10 based on the engine rotation speed, the intake air amount, and the accelerator opening degree detected by the above-described sensors. The ECU 20 controls the fuel injection amount, the intake air amount, and the ignition timing in accordance with the required torque and the target rotation speed. For example, when the engine 10 is in an idle operation state, the ECU 20 controls the fuel injection amount, the intake air amount, and the ignition timing so that the engine rotation speed becomes a target idle rotation speed and the engine torque becomes the required torque.

The ECU 20 switches the traveling mode to any one of a normal mode, a sport mode, an eco mode, and a circuit mode. The driver switches the traveling mode to the normal mode, the sport mode, or the eco mode by operating the mode selection switch 25. Regarding the circuit mode, for example, when the vehicle 1 is in a circuit field, the drive operates a mobile terminal such as a smartphone to switch the traveling mode to the circuit mode. When the traveling mode is switched to the circuit mode, control maps of the vehicle 1 is switched to control maps in which priority is given to the traveling performance corresponding to the circuit mode. This improves the traveling performance of the vehicle 1 as compared with the traveling modes other than the circuit mode. The switching to the circuit mode may be performed by the mode selection switch 25 described above.

The ECU 20 executes a fuel cut process for stopping fuel injection to the engine 10 when a predetermined condition is satisfied. Specifically, when the engine rotation speed becomes equal to or greater than a fuel cut rotation speed, the ECU 20 executes the fuel cut process of the engine 10. The fuel cut rotation speed is set to a value higher than a target idle rotation speed. This improves fuel efficiency. The fuel cut is also executed in the idle operation state. The fuel cut process is an example of a process executed by the fuel cut control unit.

[Performance Control]

Figure 2:
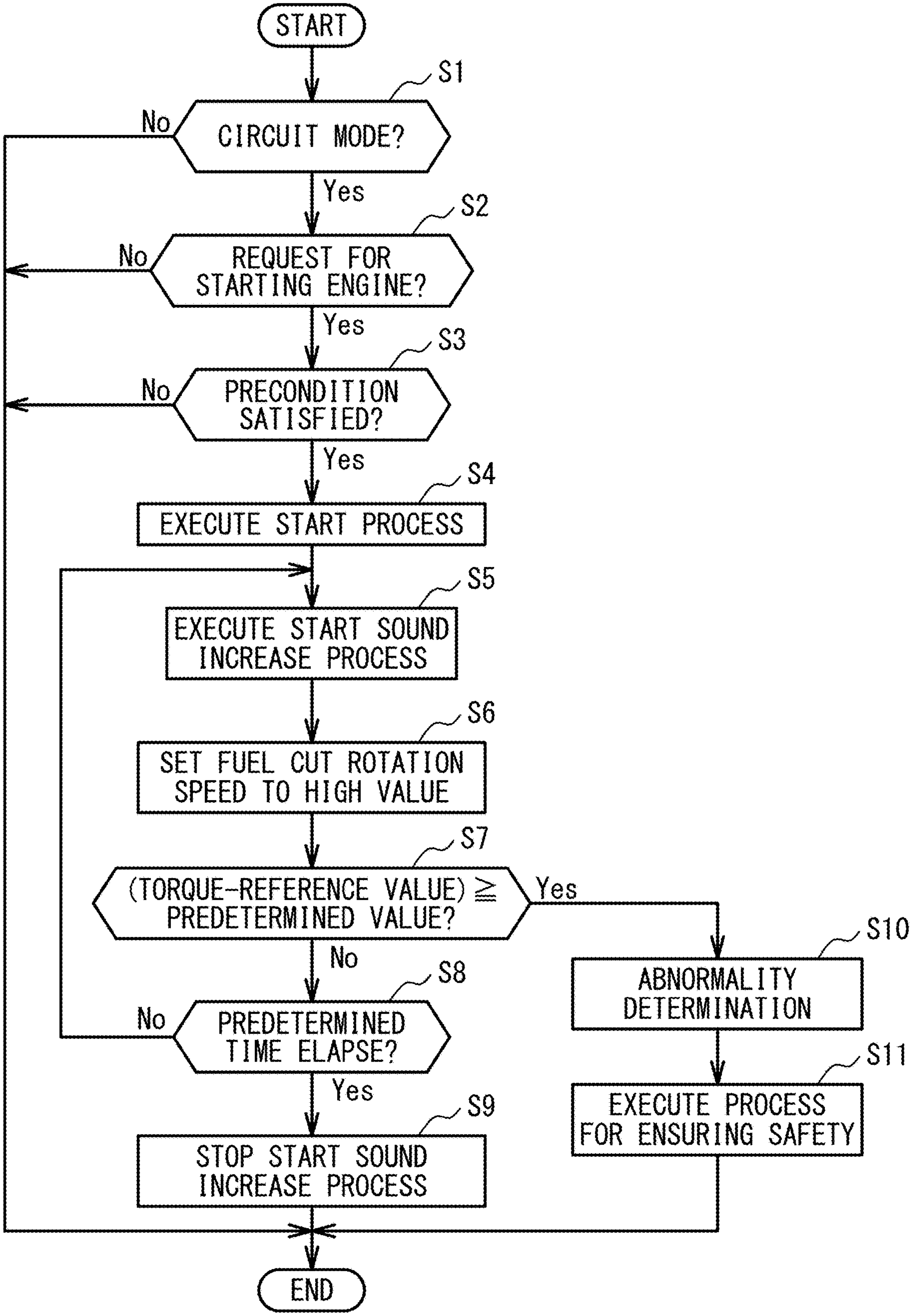
FIG. 2 is a flowchart illustrating an example of the performance control.

FIG. 2 is a flowchart illustrating an example of the performance control. This control is continuously repeated while the ignition is on. The ECU 20 determines whether or not the traveling mode is switched to the circuit mode (step S1). If the determination result in step S1 is No, the control is terminated. Step S1 is an example of a process executed by the mode determination unit. If the determination result is Yes in step S1, the ECU 20 determines whether or not there is a request for starting the engine 10 (step S2). If the determination result in step S2 is No, the control is terminated.

If the determination result in step S2 is Yes, it is determined whether or not a precondition for executing a start sound increase process described later is satisfied (step S3). The precondition is, for example, that the vehicle is in a stopped state, the accelerator opening degree is zero, and the shift range is the N range. As will be described in detail later, in the start sound increase process, a blowing rotation speed at the time of starting the engine 10 is increased. Safety is secured by executing the start sound increase process when the above precondition is satisfied. If the determination result in step S3 is No, the control is terminated.

If the determination result is Yes in step S3, the ECU 20 executes the start process of the engine 10 (step S4), and executes the start sound increase process (step S5). The start process is a process of cranking the engine 10 by the starter 9, and of starting fuel injection when the engine rotation speed becomes equal to or higher than a predetermined value. The start sound increase process is a process of increasing the start sound of the engine 10 as compared to the case where the traveling mode is other than the circuit mode. Specifically, the start sound is increased by increasing the blowing engine rotation speed at the time of starting the engine 10. The blowing engine rotation speed is an engine rotation speed that is higher than the target idle rotation speed immediately after the start of the engine 10. The increase in the blowing engine rotation speed is achieved by increasing a throttle opening degree at the time of starting and by increasing the fuel injection amount, as compared with the case where the traveling mode is other than the circuit mode. Since the start sound of the engine 10 is large, the performance of the circuit mode is improved. Step S5 is an example of a process executed by the start sound control unit.

Next, the ECU 20 sets the fuel cut rotation speed described above to a higher value during the execution of the start sound increase process than during the stop of the start sound increase process (step S6). During the execution of the start sound increase process, the blowing engine rotation speed increases as described above. Since the fuel cut rotation speed is set to a high value during the execution of the start sound increase process, the blowing engine rotation speed during the execution of the start sound increase process is prevented from becoming equal to or higher than the fuel cut rotation speed and the fuel cut process is prevented from being executed. Step S6 is an example of a process executed by the fuel cut control unit.

Next, the ECU 20 determines whether an engine torque is higher than a predetermined reference value by a predetermined value or more (step S7). The predetermined reference value is set to an engine torque during execution of the start sound increase process when the engine 10 is normal. The predetermined reference value is obtained beforehand by experiment and stored in the ROM of the ECU 20. The engine torque may be calculated based on the intake air amount detected by the air flow meter 23, or may be detected by a torque sensor. Step S7 is an example of a process executed by the abnormality determination unit.

If the determination result is No in step S7, the ECU 20 then determines whether or not a predetermined time elapses from the start of the start sound increase process (step S8). If the result of the determination in step S8 is No, the process from step S5 is performed again.

If the determination result is Yes in step S8, the ECU 20 stops the start sound increase process (step S9). As described above, in the start sound increase process, the blowing engine rotation speed at the time of starting the engine 10 increases. Therefore, the start sound increase process is stopped in consideration of safety. Note that, by stopping the start sound increase process, the fuel cut rotation speed and the predetermined reference value are returned to the original low values.

If the determination result is Yes in step S7, the ECU 20 determines that an abnormality occurs in the engine 10 (step S10), and executes a process for ensuring safety (step S11). The process for ensuring safety is, for example, a process of stopping the start sound increase process and limiting the vehicle speed, a process of forcibly stopping the engine 10, or the like. Step S10 is an example of a process executed by the abnormality determination unit.

Figure 3:
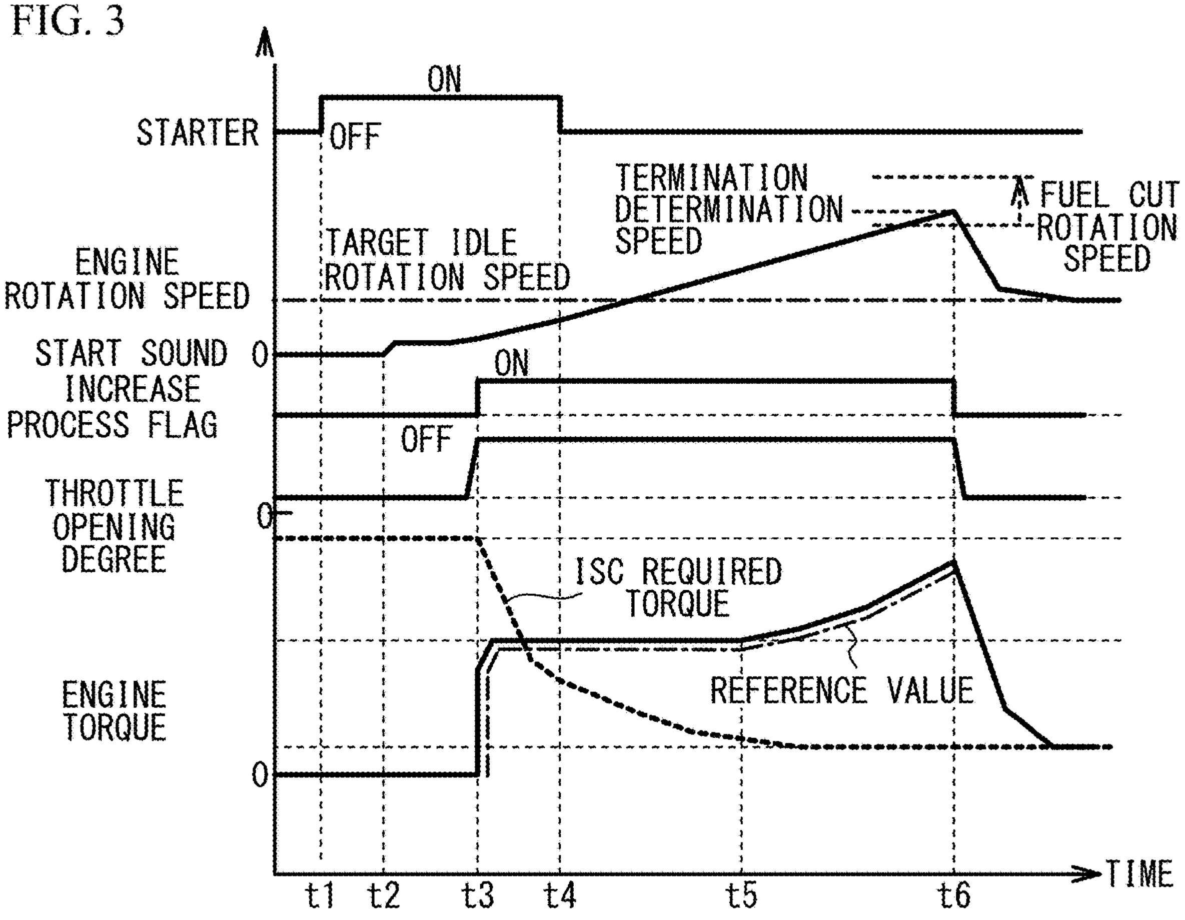
FIG. 3 is a timing chart illustrating an example of the performance control.

FIG. 3 is a timing chart illustrating the performance control. FIG. 3 illustrates a driving state of the starter, the engine rotation speed, an ON/OFF state of a start sound increase process flag, the throttle opening degree, and the engine torque. Note that FIG. 3 illustrates a reference value for determining an abnormality of the engine 10 during execution of the above-described start sound increase process. FIG. 3 illustrates the transition of an ISC required torque. The ISC required torque is engine torque required for the engine rotation speed to converge to the target idle rotation speed.

When a request for starting the engine 10 is made in the circuit mode, the engine 10 is driven (time t1), and the engine rotation speed starts to increase (time t2). Thereafter, the start sound increase processing flag is switched to ON, the throttle opening degree is increased by a predetermined amount, combustion is started, and the torque is increased (time t3). Then, the starter 9 is stopped (time t4). The engine torque starts to further increase (time t5).

When the engine rotation speed becomes equal to or higher than a predetermined termination determination speed, the start sound increase process flag is switched to OFF, the throttle opening degree is reduced to an original opening degree, and the torque is reduced (time t6). The fuel cut rotation speed during the execution of the start sound increase process is set to a value higher than the predetermined termination determination speed. Thereafter, the engine torque converges to the ISC required torque, and the engine rotation speed converges to the target idle rotation speed. In this way, the start sound increase process is stopped after the predetermined time elapses as described above. That is, in the present embodiment, when the engine rotation speed becomes equal to or higher than a predetermined termination determination speed, it is considered that a predetermined time elapses from the start of the start sound increase process, and the start sound increase process is stopped. The time from when the start sound increase process flag is switched to ON may be measured, and the start sound increase process may be stopped when the measured time reaches a predetermined time.

As illustrated in FIG. 3, during the execution of the start sound increase process, the predetermined reference value varies along the transition of the engine torque in the normal state. For example, it might be determined that an abnormality occurs in the engine 10 when the torque of the engine 10 becomes higher than the ISC required torque by a predetermined value or more during the execution of the start sound increase process. However, in this case, the difference between the peak of the engine torque and an ISC required torque might be increased by the execution of the start sound increase process (time t6), and it might be erroneously determined that an abnormality occurs in the engine 10. Therefore, the predetermined reference value used for the abnormality determination during the execution of the start sound increase process is set to the engine torque during the execution of the start sound increase process when the engine 10 is normal. Therefore, the above-described erroneous determination is avoided. The predetermined reference value is set to a value corresponding to the engine rotation speed by referring to a map corresponding to the engine rotation speed during execution of the start sound increase process when the engine 10 is normal.

In the above embodiment, the ECU 20 mounted in the engine vehicle is described as an example of the control device for the vehicle. However, the vehicle in which such an ECU is mounted may be a hybrid vehicle including an engine and a motor as traveling power sources. In the case of an electric vehicle including only a motor as a traveling power source, a sound simulating the start sound of the engine may be output from, for example, a speaker mounted in the vehicle interior at the time of starting the motor as the start sound increase process. This also improves the performance in the circuit mode.

Although some embodiments of the present disclosure have been described in detail, the present disclosure is not limited to the specific embodiments but may be varied or changed within the scope of the present disclosure as claimed.

What is claimed is:

1. A control device for a vehicle, the control device comprising:

a mode determination unit configured to determine whether a traveling mode of the vehicle is switched to a circuit mode or not; and a start sound control unit configured to execute a start sound increase process of increasing a start sound of a traveling power source of the vehicle in a case where the mode determination unit makes an affirmative determination, as compared to a case where the mode determination unit makes a negative determination, wherein the traveling power source is an engine, and the start sound control unit is configured to execute the start sound increase process by increasing a blowing rotation speed at a time of starting the engine in a case where the mode determination unit makes an affirmative determination, as compared to a case where the mode determination unit makes a negative determination.

2. The control device for the vehicle according to claim 1, further comprising a fuel cut control unit configured to execute a fuel cut process of the engine when a rotation speed of the engine in an idle operation state is equal to or higher than a fuel cut rotation speed higher than a target idle rotation speed, wherein the fuel cut control unit is configured to set the fuel cut rotation speed to a higher value during execution of the start sound increase process than during stop of the start sound increase process.

3. The control device for the vehicle according to claim 1, wherein the start sound control unit stops the start sound increase process after a predetermined time elapses from a start of the start sound increase process.

* * * * *